United States Patent [19]

Müller et al.

[11] Patent Number: 5,143,676
[45] Date of Patent: Sep. 1, 1992

[54] PROCESS FOR PRODUCTION OF A FILM INCLUDING A SILICONE LAYER

[76] Inventors: Josef Müller, Josef-Kolb-Str. 20, 8557 Eggolsheim; Alfred Neudecker, Buckenhofener Str. 41, 8550 Forchheim, both of Fed. Rep. of Germany

[21] Appl. No.: 617,136

[22] Filed: Nov. 23, 1990

[30] Foreign Application Priority Data

Nov. 23, 1989 [DE] Fed. Rep. of Germany ....... 3938808

[51] Int. Cl.$^5$ ............................................. B29C 47/04
[52] U.S. Cl. ..................................... 264/171; 264/132; 264/245; 425/131.1
[58] Field of Search ............... 264/171, 132, 300, 245; 425/131.1, 462

[56] References Cited

U.S. PATENT DOCUMENTS

| | | | |
|---|---|---|---|
| 3,733,381 | 5/1973 | Willette et al. | 264/132 |
| 4,462,852 | 7/1984 | Custor | 264/171 |
| 4,565,725 | 1/1986 | Spamer et al. | 264/171 |
| 4,594,211 | 6/1986 | Mohnhaupt | 264/171 |
| 4,780,364 | 10/1988 | Wade et al. | 264/171 |
| 4,839,123 | 6/1989 | Duncan | 264/300 |

FOREIGN PATENT DOCUMENTS 62-16120  1/1987  Japan .................................. 264/171

*Primary Examiner*—Jeffery Thurlow
*Attorney, Agent, or Firm*—Cushman, Darby & Cushman

[57] ABSTRACT

Process for the production of a film, at least one side of which is provided with a silicone layer, where the film is produced by the coextrusion process and has at least three layers, one outer layer of which consists of silicone, under which a colored intermediate layer is located, on the side of which opposite the silicone layer a further preferably white layer is provided.

6 Claims, 1 Drawing Sheet

PROCESS FOR PRODUCTION OF A FILM INCLUDING A SILICONE LAYER

The invention relates to a process for the production of a film, at least one side of which is provided with a silicone layer, as well as to a film produced by this process.

Considerable problems arise with the production of such films when the silicone layer requires coloring for identification purposes. On the one hand, it is not possible to incorporate in the only approx. 0.5 micron thick silicone layer the amount of color pigment needed to permit clear identification, while on the other hand the color pigments impair the curing of the silicone layer, which has an adverse effect on the release properties of the silicone layer.

The purpose of the invention is to propose a process for the production of a film provided with a silicone layer that avoids the above-mentioned disadvantages.

In the solution to this problem proposed by the invention, the film is produced by the coextrusion process and has at least three layers, one outer layer of which consists of silicone, under which a colored intermediate layer is located, on the side of which opposite the silicone layer a further preferably white layer is provided.

In this way the siliconised film is colored without incurring the disadvantages of direct coloration.

It has also proved very advantageous if in accordance with the invention a colored intermediate layer is provided on each side of the preferably white layer, which can be made from HDPE, PP or other suitable raw materials to improve heat resistance and tensile strength, and is in each case covered on its outside by a silicone layer.

Simple color identification can be achieved in this way even when the film is siliconised on both sides.

It is very advantageous if in accordance with the invention the two intermediate layers have different colors and the two outer layers contain silicone with different properties.

The different colors make it possible to identify silicone with different properties or thicknesses.

It can also be very advantageous if in accordance with a further development of the invention the intermediate layer is printed.

This makes it possible to include information, e.g. on usability, properties etc., without the printing ink affecting the silicone layer itself.

A coextruded film according to the invention with at least one outer silicone layer has the features that at least three layers are provided, the outer layer of which is made from silicone, adjacent to which is an intermediate layer that is colored and on the side of which opposite the silicone layer a further white layer is provided.

It is also very advantageous if in accordance with the invention differently coloured intermediate layers are located on each side of the white layer (middle layer), adjacent to which silicone layers with different properties are provided.

Figure 1:
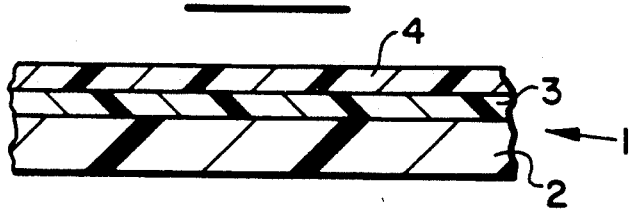
FIG. 1 is a cross-section through a three-layer film, with a substrate layer, an intermediate layer and a silicone layer.

1 in FIG. 1 is a coextruded film, which consists of a substrate layer 2, an intermediate layer 3 and a silicone layer 4. The substrate layer is white, the intermediate layer contains a different colourant and the silicone layer is colorless. This structure guarantees that the side with the silicone layer is easy to recognize and that the film is used correctly.

Figure 2:
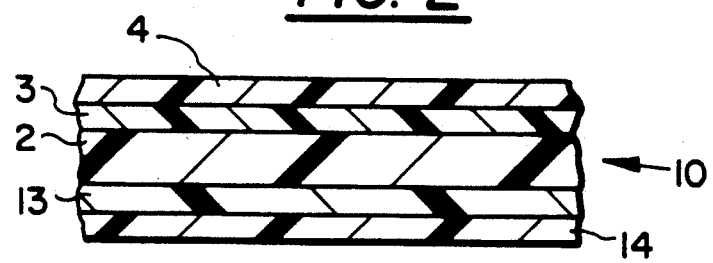
FIG. 2 is a cross-section through a five-layer film with differently colored intermediate layers and FIG. 3 is a cross-section through another five-layer film, where one intermediate layer is printed.

FIG. 2 shows a five-layer film 10, both sides of the substrate layer of which are bonded to an intermediate layer 3/13 which has different colors. Each of the intermediate layers in turn has a silicone outer layer 4/14, which has different properties. The different colors of the intermediate layers again make sure here that the different silicone layers are not confused.

Figure 3:
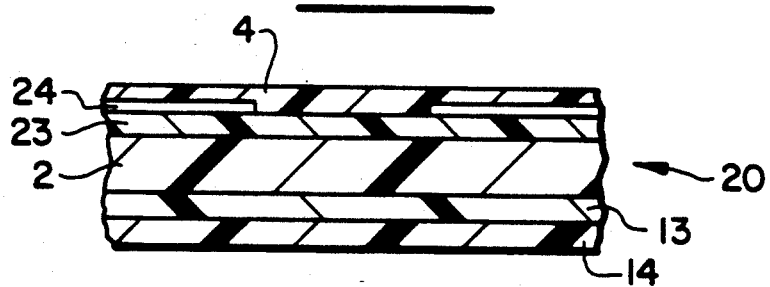

In the embodiment shown in FIG. 3, the five-layer film 20 is again provided with a white substrate layer 2, which is covered on both sides by intermediate layers 13/23. The intermediate layer 13 is colored, while the intermediate layer 23 has been provided with a print motif 24. Two silicone layers 4/14, which can again have different properties, are again provided as outer layers.

We claim:

1. In a process for the production of a film at least one side of which is provided with a silicone layer which requires coloring, for identification purposes, the improvement which comprises producing the film by coextrusion so that the coextruded film comprises at least three layers, one of which is an outer layer of silicone and under which is a colored intermediate layer with a further layer on the other side of the intermediate layer, whereby the coextruded siliconized film is colored without including coloring pigment in the silicone layer itself.

2. The process of claim 1 wherein the further layer on the other side of the intermediate layer is a white layer.

3. The process according to claim 1 wherein the film as coextruded includes a colored intermediate layer on both sides of the further layer with an outer silicone layer on both sides of the film.

4. The process according to claim 3 wherein the further layer is a white layer which comprises HDPE or PP to provide improved heat resistance and tensile strength.

5. The process of claim 4 wherein the intermediate layers are of different color and the outer layers contain silicone with different properties.

6. The process of claim 1 wherein the intermediate is printed.

* * * * *